United States Patent
Hammarwall et al.

(10) Patent No.: US 9,882,677 B2
(45) Date of Patent: Jan. 30, 2018

(54) DATA TRANSMISSION USING PRECODED REFERENCE SYMBOLS FROM MULTIPLE SUBFRAMES

(71) Applicant: Telefonaktiebolaget L M Ericsson (publ), Stockholm (SE)

(72) Inventors: David Hammarwall, Vallentuna (SE); George Jöngren, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 217 days.

(21) Appl. No.: 14/760,487

(22) PCT Filed: Jan. 17, 2013

(86) PCT No.: PCT/EP2013/050840
§ 371 (c)(1),
(2) Date: Jul. 13, 2015

(87) PCT Pub. No.: WO2014/111144
PCT Pub. Date: Jul. 24, 2014

(65) Prior Publication Data
US 2015/0358134 A1    Dec. 10, 2015

(51) Int. Cl.
*H04L 5/00* (2006.01)
*H04L 1/00* (2006.01)
(Continued)

(52) U.S. Cl.
CPC ............ *H04L 1/001* (2013.01); *H04L 1/0025* (2013.01); *H04L 5/0026* (2013.01);
(Continued)

(58) Field of Classification Search
CPC ..... H04L 1/001; H04L 5/0055; H04L 5/0026; H04L 5/0094; H04L 1/0025;
(Continued)

(56) References Cited

U.S. PATENT DOCUMENTS 9,730,205 B2 * 8/2017 Li ....................... H04W 72/042
2012/0236798 A1   9/2012 Raaf et al.
(Continued)

*Primary Examiner* — Brian O'Connor
(74) *Attorney, Agent, or Firm* — Coats & Bennett, PLLC

(57) ABSTRACT

For data transmission in a wireless communication network, a radio channel divided into subframes in the time domain is used. A network system (100) assigns resource elements in a first subframe (20) and at least one subsequent subframe (21, 22) to a user equipment (200). By downlink control information transmitted in the first subframe (20), the network system (100) sends a multi-subframe assignment (503) to the user equipment (200). The multi-subframe assignment (503) indicates the assigned resource elements to the user equipment (200). In at least a part of the assigned resource elements in the first subframe (20) and at least a part of the assigned resource elements in the at least one subsequent subframe (21, 22), the network system (100) transmits precoded reference symbols (504, 06, 508) to the user equipment (200). Further, the network system (100) sends an indication (501) to the user equipment (200) that the user equipment (200) is allowed to assume that precoding of the reference symbols (504, 506, 508) is static over the first subframe (20) and the at least one subsequent subframe (20, 21). The user equipment (200) may utilize the precoded reference symbols (504, 506, 508) for channel estimation.

21 Claims, 9 Drawing Sheets

(51) Int. Cl.
*H04W 72/04* (2009.01)
*H04L 25/03* (2006.01)
*H04L 1/18* (2006.01)

(52) U.S. Cl.
CPC .......... *H04L 5/0051* (2013.01); *H04L 5/0055* (2013.01); *H04L 5/0094* (2013.01); *H04L 25/03949* (2013.01); *H04W 72/042* (2013.01); *H04L 1/18* (2013.01); *H04L 1/1812* (2013.01); *H04L 5/0048* (2013.01)

(58) Field of Classification Search
CPC ... H04L 25/03949; H04L 5/0051; H04L 1/18; H04L 5/0048; H04L 1/1812; H04W 72/042
See application file for complete search history.

(56) References Cited

U.S. PATENT DOCUMENTS

| | | | |
|---|---|---|---|
| 2015/0163039 A1* | 6/2015 | Davydov | H04W 72/042 370/329 |
| 2015/0280876 A1* | 10/2015 | You | H04L 5/0048 370/329 |
| 2015/0289237 A1* | 10/2015 | Kim | H04L 27/26 370/329 |

* cited by examiner

DATA TRANSMISSION USING PRECODED REFERENCE SYMBOLS FROM MULTIPLE SUBFRAMES

TECHNICAL FIELD

The present invention relates to methods for data transmission in a wireless communication network and to corresponding devices.

BACKGROUND

In wireless communication networks, it is know to assign resource elements of the available radio capacity to be used for data transmission to or from a user equipment (UE). Depending on the underlying radio access technology, such resource elements may correspond to time slots and/or to portions of the available frequency spectrum.

For example, a radio access technology specified by 3GPP ($3^{rd}$ Generation Partnership Project) and referred to as LTE (Long Term Evolution) uses Orthogonal Frequency Division Multiplexing (OFDM) for downlink (DL) transmissions to UEs and Discrete Fourier Transform (DFT) spread OFDM for uplink (UL) transmissions from the UEs. In this case, the available resources may be organized in a time-frequency grid of subcarriers with 15 kHz width and time slots corresponding to the duration of one OFDM symbol. A resource element may then extend over one subcarrier in the frequency domain and the duration of one OFDM symbol in the time domain. Such a time-frequency grid may be defined individually for each antenna port. In this connection, an antenna port may be defined such that the channel over which a certain OFDM symbol on the antenna port is conveyed can be inferred from the channel over which another symbol on the same antenna port is conveyed.

In the time domain, LTE DL transmissions are organized in radio frames of 10 ms duration, each radio frame consisting of ten equally-sized subframes of 1 ms duration. The subframes are in turn divided into two slots, each having 0.5 ms duration. Each subframe includes a number of OFDM symbols which may be used for conveying control information or data.

The resource allocation in LTE is defined in terms of resource blocks. A resource block corresponds to one time slot in the time domain, i.e., having the duration of one OFDM symbol, and 12 contiguous subcarriers in the frequency domain. In LTE, the highest granularity level of assigning resource elements corresponds to two in time consecutive resource blocks, also referred to as a resource block pair. Dynamic scheduling may be performed in each subframe. For this purpose, an LTE base station referred to as eNB may use a DL control channel, termed as Physical DL Control Channel (PDCCH) or enhanced PDCCH (ePDCCH) to transmit DL assignments and UL grants to the UEs served by the base station. Such DL control channels are transmitted in the first OFDM symbol(s) of the subframe and typically spans substantially the whole system bandwidth, i.e., all available subcarriers of the utilized carrier. If an UE has decoded such DL assignment, it knows which time and frequency resources in the subframe contain DL data destined to the UE. Similarly, upon receiving an UL grant, the UE knows on which time/frequency resources it should transmit UL data. The DL data are carried by a channel which is shared by the UEs served by the base station and is referred to as Physical DL Shared Channel (PDSCH). Similarly, the UL data are carried by a channel which is shared by the UEs served by the base station and is referred to as Physical UL Shared Channel (PUSCH).

The ePDCCH is generally similar to the PDCCH, but offers some enhanced functionalities and may be subject to additional requirements. For example, while the PDCCH requires cell specific reference symbols (CRS) for its demodulation, the ePDCCH may require UE specific demodulation reference symbols (DMRS) for its demodulation. This may allow for utilizing UE specific spatial processing for transmission of the ePDCCH.

In the above-mentioned LTE radio access technology, but also in other radio access technologies, demodulation and decoding of sent data typically requires estimation of a propagation characteristic of the radio channel. This may be accomplished by using transmitted reference symbols (RS), i.e., symbols known by the receiver. In LTE, CRS are transmitted in all DL subframes. Besides their usage for DL channel estimation, they may also be used for mobility measurements performed by the UEs. In addition, also UE specific RS (also referred to as DMRS) may be used. The UE specific RS are typically dedicated exclusively to radio channel estimation for demodulation purposes. In LTE, the UE specific RS are precoded along with the data transmitted to the UE. Accordingly, the radio channel characteristic estimated from the UE specific RS also includes the precoding operation. Accordingly, the precoding operation may become transparent to the UE, which means that the radio channel characteristic estimated from the UE specific RS can be directly applied by the UE for spatial filtering or demodulation of the received data, without explicitly taking into account the precoding operation.

The above-mentioned transparency of the precoding operation to the UE it allows for flexibly adapting precoding and/or beamforming when performing DL transmissions to the UE. However, channel estimation filtering using permutations in time and/or frequency may be constrained. For example, the effective radio channel traversed by the UE specific RS can change abruptly when the transmitter updates the precoding with respect to its time and/or frequency characteristics. In view of this situation, a concept referred to as precoding resource block (PRB) bundling was introduced in LTE. In these concepts, a group of frequency consecutive PRB pairs within a subframe are grouped into a precoding resource group (PRG). For such PRG, the UE can assume that the precoding operation remains static. This ensures that that the UE can effectively perform time and frequency domain filtering throughout the PRG so as to accomplish estimation of the propagation characteristic of the radio channel. The size of the PRG may range from one to three PRBs, depending on the system bandwidth.

The above concepts of PRB bundling tend to limit the performance of radio channel estimation and hence demodulation performance. Further, signal overhead due to the UE specific RS may need to be relatively high to allow sufficient radio channel estimation accuracy.

Accordingly, there is a need for techniques which allow for efficiently utilizing precoded RS in data transmission.

SUMMARY

According to an embodiment of the invention, a method of data transmission in a wireless communication network is provided. The wireless communication network uses a radio channel divided into subframes in the time domain. According to the method, a network system assigns resource elements in a first subframe and at least one subsequent subframe to a UE. By DL control information transmitted in the first subframe, the network system sends a multi-subframe assignment to the UE. The multi-subframe assignment indicates the assigned resource elements to the UE. In at least a part of the assigned resource elements in the first subframe and at least a part of the assigned resource elements in the at least one subsequent subframe, the network system transmits precoded RS to the UE. Further, the network system sends an indication to the UE that the UE is allowed to assume that precoding of the RS is static over the first subframe and the at least one subsequent subframe.

According to a further embodiment of the invention, a method of data transmission in a wireless communication network is provided. The wireless communication network uses a radio channel divided into subframes in the time domain. According to the method, a UE receives DL control information comprising a multi-subframe assignment indicating resource elements in a first subframe and in at least one subsequent subframe. The resource elements are assigned to the UE. In at least a part of the assigned resource elements in the first subframe and at least a part of the assigned resource elements in the at least one subsequent subframe, the UE receives precoded RS. Further, the UE assumes that precoding of the RS is static over the first subframe and at least one subsequent subframe.

According to a further embodiment of the invention, a network system for data transmission in a wireless communication network is provided. The wireless communication network uses a radio channel divided into subframes in the time domain. The network system comprises at least one processor and an interface for connecting to a UE. The at least one processor is configured to:
- assign resource elements in a first subframe and in at least one subsequent subframe to the UE,
- by DL control information transmitted in the first subframe, send a multi-subframe assignment indicating the assigned resource elements to the UE,
- in at least a part of the assigned resource elements in the first subframe and at least a part of the assigned resource elements in the at least one subsequent subframe, transmit precoded RS to the UE, and
- send to the UE an indication that the UE is allowed to assume that precoding of the RS is static over the first subframe and at least one subsequent subframe.

According to a further embodiment of the invention, a UE for data transmission in a wireless communication network is provided. The wireless communication network uses a radio channel divided into subframes in the time domain. The UE comprises at least one processor and an interface for connecting to the wireless communication network. The at least one processor is configured to:
- receive DL control information comprising a multi-subframe assignment indicating resource elements in a first subframe and in at least one subsequent subframe, the resource elements being assigned to the UE,
- in at least a part of the assigned resource elements in the first subframe and at least a part of the assigned resource elements in the at least one subsequent subframe, receive precoded RS, and
- assume that precoding of the RS is static over the first subframe and at least one subsequent subframe.

DETAILED DESCRIPTION OF EMBODIMENTS

In the following, concepts in accordance with exemplary embodiments of the invention will be explained in more detail and with reference to the accompanying drawings. The illustrated embodiments relate to concepts for traffic inspection in a 3GPP LTE mobile communication network. However, the concepts may also be applied in a corresponding manner to other types of radio access technology, e.g., Wideband Code Division Multiple Access (WCDMA), WiMax, Ultra Mobile Broadband (UMB), and Global System for Mobile Communications (GSM) radio access technology.

Figure 1:
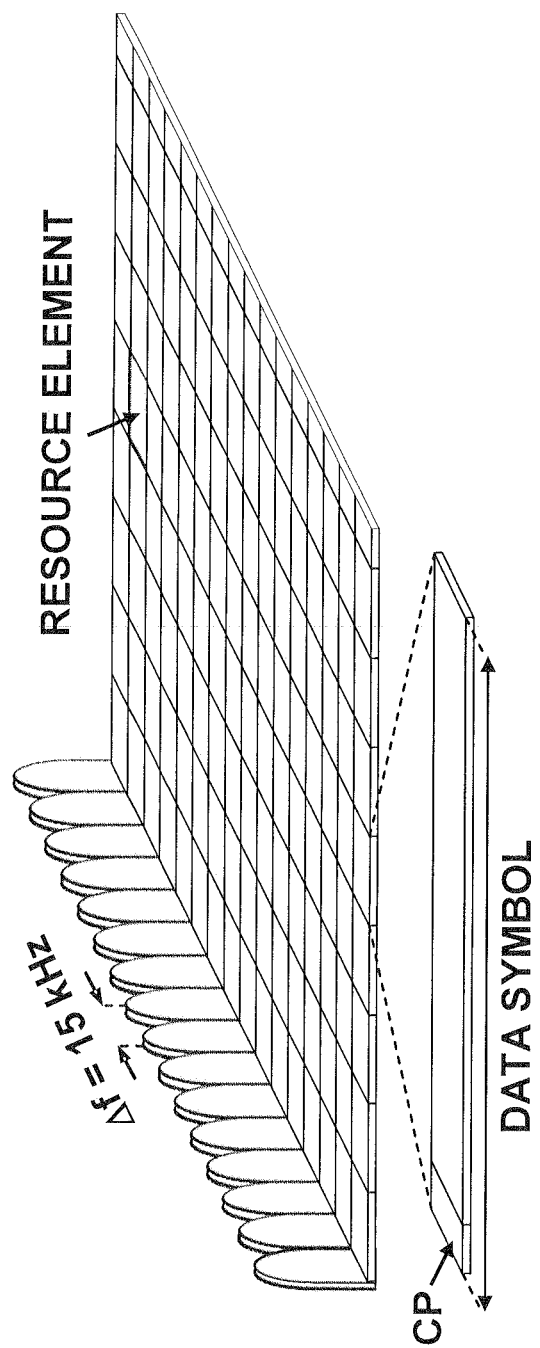
FIG. 1 schematically illustrates a time-frequency grid of resource elements as used in an embodiment of the invention.

FIG. 1 illustrates a time-frequency grid as used in the mobile communication network. The time-frequency grid is assumed to be in accordance with the LTE specifications. As illustrated, the time-frequency grid comprises a plurality of resource elements which correspond to one subcarrier of 15 kHz width in the frequency domain and a time slot having the duration of one OFDM symbol. As further illustrated, the OFDM symbols may each include a cyclic prefix (CP).

Figure 2:
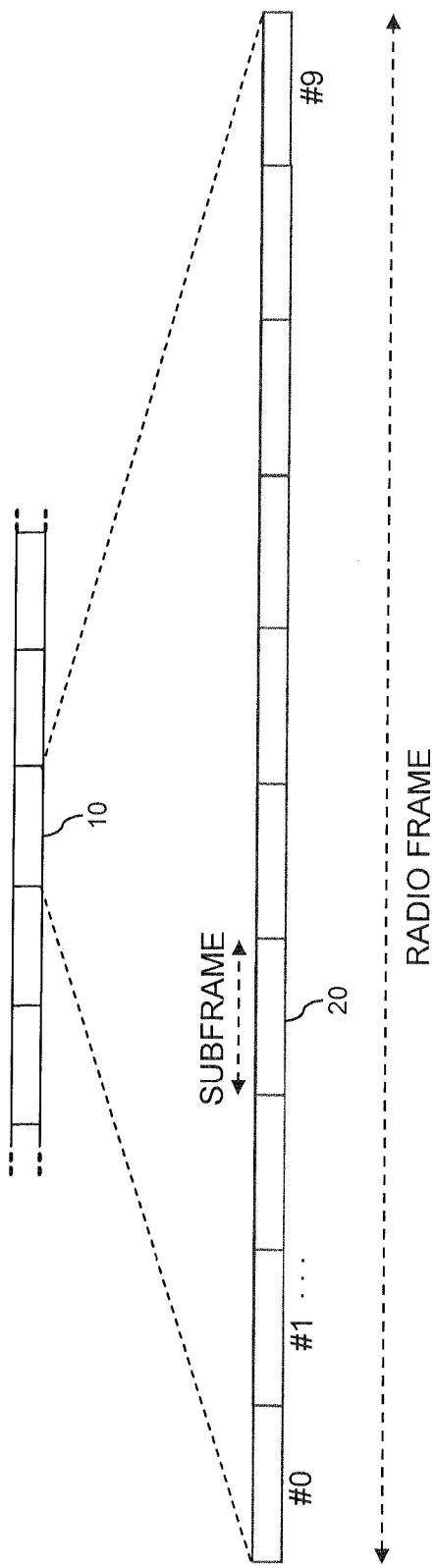
FIG. 2 schematically illustrates a radio frame structure in the time domain as used in an embodiment of the invention.

The time-domain structure of DL transmissions in the mobile communication system is illustrated in FIG. 2. As illustrated, the DL transmissions are organized in a sequence of radio frames 10 which each include a number of subframes 20. In accordance with the LTE specifications, it is assumed that the duration of a radio frame 10 is 10 ms and the duration of a subframe is 1 ms, which means that the radio frames 10 each consist of ten subframes.

Scheduling of DL transmissions to a UE is assumed to be accomplished at the level of resource blocks formed of multiple resource elements. Specifically, it is assumed that the resource blocks correspond to a duration of one OFDM symbol in the time domain and 12 contiguous subcarriers in the frequency domain. Further, the resource elements may be assigned with a maximum granularity of two resource blocks which are consecutive in time. Accordingly, the scheduling may be accomplished in a similar way as in known LTE systems.

Figure 3:
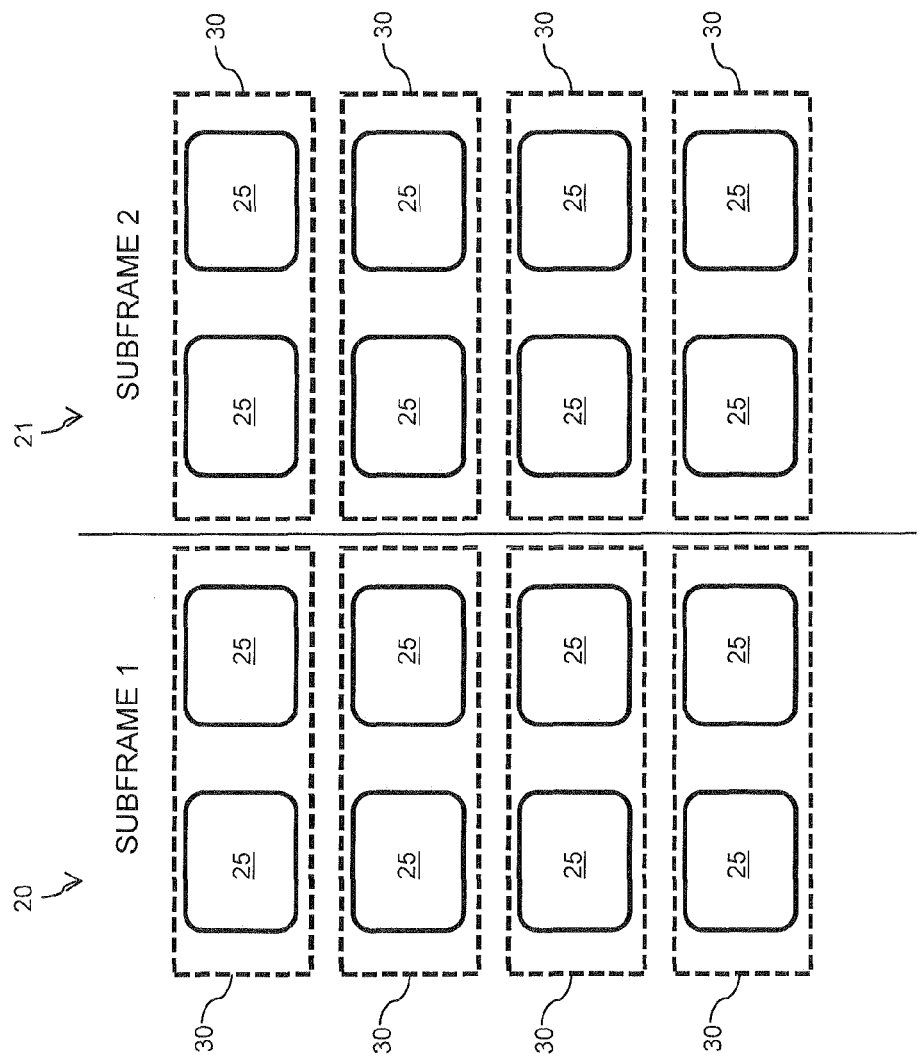
FIG. 3 schematically illustrates an exemplary grouping of resource elements.

Still further, the mobile communication system is assumed to support PRB bundling as used in known LTE systems. This type of PRB bundling is schematically illustrated in FIG. 3. As illustrated, a plurality of PRBs 25 are provided in a first subframe 20, and further PRBs 25 are provided in a subsequent subframe 21 of the first subframe 20. The PRBs 25 are grouped to PRGs 30 in which precoding of the transmitted RS can assumed to be static by the UE. In the illustrated example, the PRGs 30 include two time-consecutive PRBs 22.

Figure 4:
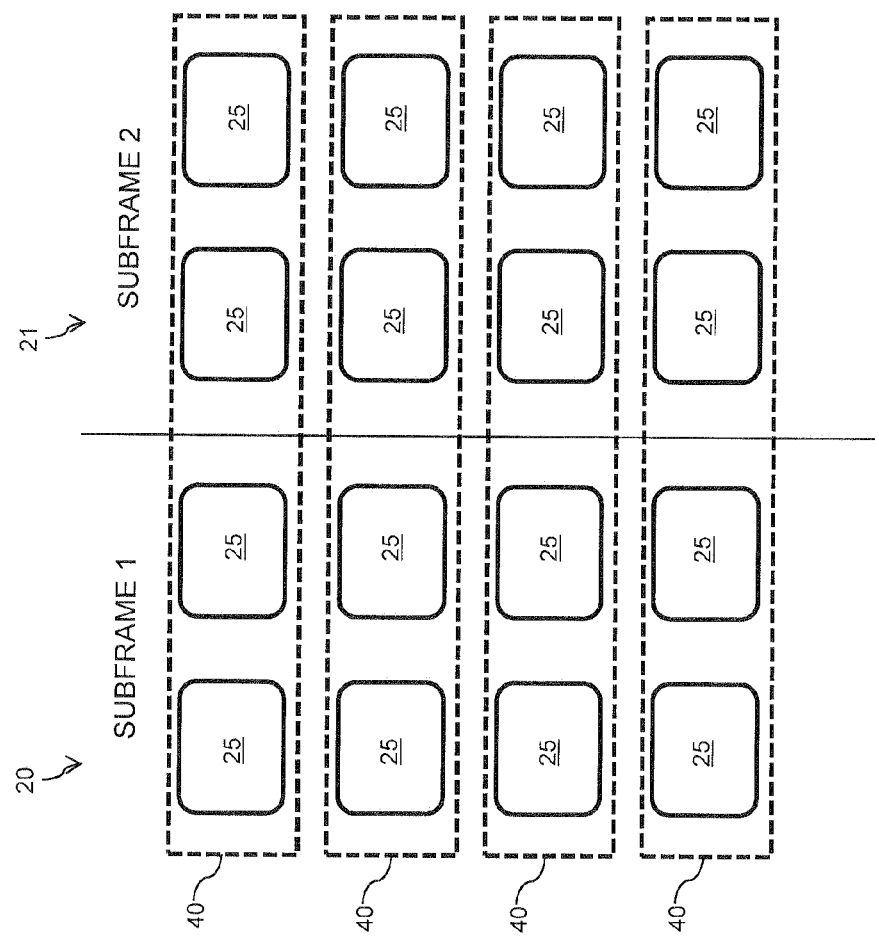
FIG. 4 schematically illustrates an exemplary grouping of resource elements according to an embodiment of the invention.

In accordance with concepts as described in the following, a group of resource elements, which are used for sending precoded RS to the UE, extends over a first subframe and at least one subsequent subframe, and the network indicates to the UE that it is allowed to assume that that the precoding for these RS. Accordingly, as illustrated in FIG. 4, a PRG 40 may extend over multiple subframes, in the illustrated example over the first subframe 20 and the subsequent subframe 21. In the example of FIG. 4, the PRGs 40 are illustrated to include four PRBs 25. Some of these PRBs 25 are located in the first subframe 20, and some of these PRBs 25 are located in the subsequent subframe 21. Accordingly, the PRGs 40 include resource elements in the first subframe 20 and resource elements in the subsequent subframe 21.

The indication to the UE applies for resource elements indicated in an assignment which assigns resource elements in multiple subframes to the UE, which in the following will also be referred to as multi-subframe assignment.

In 3GPP LTE, such multi-subframe assignments may be implemented as multi Transmission-Time-Interval (TTI) scheduling assignments. A multi-TTI scheduling assignment indicates to a UE resource blocks in multiple TTIs which are assigned to the UE for reception of DL data. Since in LTE the TTI corresponds to a subframe, the multi-TTI scheduling assignment also indicates resource blocks from different subframes. The multi-TTI assignments may be transmitted in Downlink Control Information (DCI) in the PDCCH, in particular in the first subframe of the multi-TTI interval. In this way, the multi-TTI assignments may be provided dynamically for each multi-TTI interval.

By allowing the PRG 40 to extend over multiple subframes, the processing gain for estimating the radio channel can be increased. In combination with multi-TTI scheduling assignments, this may be specifically beneficial because the UE specific RS are present in multiple subframes, and the UE may also assume that the same PRBs are used in the different subframes.

The UE may use the precoded UE specific RS to estimate the propagation characteristic of the radio channel for a certain frequency range, e.g., for one or more subbands. This is may be accomplished using similar channel estimation algorithms as in the case of UE specific RS from a single subframe, however now using UE specific RS from the different subframes. For these RS the UE can assume that the precoding of the UE specific RS is static over the different subframes (at least for this frequency range). This means that the precoding does not change in such a way that there is an impact on evaluation of the UE specific RS by the UE. On the network side, this may for example be achieved by avoiding abrupt changes concerning the time and/or frequency characteristics of the precoding, e.g., changes causing abrupt phase jumps. While this may be of course be achieved by actually keeping the applied precoding of the RS static, certain changes in the precoding may still be acceptable. Such variations may occur within the relevant frequency range, between two subframes of the considered multi-subframe interval, or even within a subframe of this interval. However, the changes are such that the assumption of static precoding is still appropriate.

In terms of operation of the UE, the assumption of static precoding may be implemented by allowing the UE to evaluate the precoded RS by combined processing of the UE specific RS, e.g., by interpolation and or other types of filtering in the time and/or frequency domain. Further, the assumption may be implemented by allowing to regard the evaluated characteristic to be equivalent to the characteristic of a radio channel as actually used for data transmission.

The UE may then utilize the estimated characteristic of the radio channel for demodulation and/or decoding of data or control information transmitted to the UE.

Figure 5:
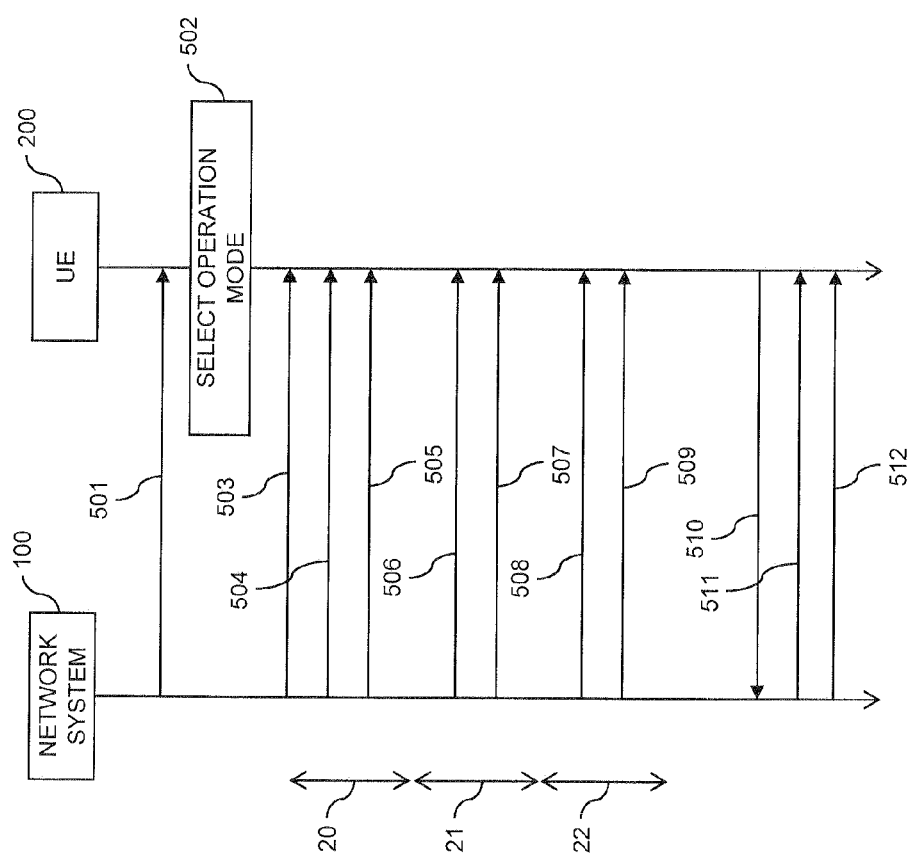
FIG. 5 schematically illustrates exemplary procedures in accordance with an embodiment of the invention.

FIG. 5 shows a signalling diagram for illustrating exemplary procedures for implementing the above concepts. The procedures of FIG. 5 involve a network system 100 and a UE 200. In the following, it will be assumed that the network system 100 and the UE 200 communicate using LTE radio access technology. Accordingly, the network system 100 would then correspond to an eNB. However, similar procedures could also be applied for other types of radio access technology.

As mentioned above, an indication may provided to the UE 200 that it may apply the assumption of static precoding. In the procedures of FIG. 5, this is achieved by the network system 100 sending message 501 to the UE 200. Message 501 may for example be a Radio Resource Control (RRC) message. In response to receiving the message 501, as illustrated by step 502, the UE 200 selects an operation mode in which it applies the assumption to certain subframes. In the illustrated procedures, the UE 200 deduces these subframes from multi-TTI scheduling assignments received from the network system 100. In the procedures of FIG. 5, the network system 100 is illustrated to send multi-TTI scheduling assignment 503 to the UE 200. In the procedures of FIG. 5, it is assumed that the multi-TTI scheduling assignment 503 assigns resource blocks in three consecutive subframes 20, 21, 22 to the UE 200. The multi-TTI scheduling assignment 503 is transmitted in the control region of the first subframe 20.

The UE 200 may operate in such a way that it applies the assumption for all or at least a part of the subframes 20, 21, 22 covered by the multi-TTI scheduling assignment 503, e.g., for all subframes 20, 21, 22 which include resource blocks indicated in the multi-TTI assignment 503. Further, the UE 200 may operate to apply the assumption for only a part of the subframes 20, 21, 22 covered by the multi-TTI scheduling assignment 503, e.g., for a given number of consecutive subframes. For example, the UE 200 could be configured to apply the assumption for not more than two consecutive subframes 20, 21, 22 covered by the multi-TTI scheduling assignment 503, e.g., only for the subframes 20 and 21.

In the some of the assigned resource elements of the subframes 20, 21, 22, the network system 100 sends precoded RS to the UE 200. For the first subframe 20, this is illustrated by exemplary RS transmission 504. For the subsequent subframes 21 and 22 this is illustrated by exemplary RS transmissions 506 and 508, respectively. Still further, the network system 100 may use the assigned resource elements to send data to the UE 200. This is illustrated by exemplary data transmissions 505, 507, and 509. It should be noted that actually multiple RS transmissions and/or multiple data transmissions may be performed within each of the subframes 20, 21, 22.

The UE 200 utilizes the received precoded RS for estimation of the propagation characteristic of the radio channel between the network system 100 and the UE 200. This is accomplished by combined evaluation of the received precoded RS. In this evaluation, the UE 200 assumes that the precoding of the received RS is static over all or at least some of the different subframes 20, 21, 22.

When performing the estimation of the channel characteristic by combined evaluation of the precoded RS received the multiple subframes to which the assumption of static precoding applies, an evaluation result taking into account all precoded RS received in these subframes would typically be available at the end of this multi-subframe interval. Accordingly, the UE 200 may operate to start decoding of the subframes after having received all subframes and the precoded RS transmitted in these subframes. For example, in the procedures of FIG. 5, the UE 200 may perform the combined evaluation of the precoded RS received in the subframes 20, 21, and 22, and may then start to demodulate and decode the subframes 20, 21, 22 on the basis of the radio channel characteristic estimated from the combined evaluation.

In some scenarios, it is however beneficial if the UE 200 starts demodulating and decoding of the subframes already before all subframes of the of the multi-subframe interval have been received by the UE 200, e.g., in order to avoid delays. In this case, the precoded RS may be evaluated as they are received and the result of the combined evaluation updated accordingly. When using such operation, the accuracy of estimation will typically increase as more precoded RS are received by the UE. This may result in that a higher decoding performance is available for the later subframes of the multi-subframe interval, as compared to the earlier subframes. Typically, the decoding performance will increase from subframe to subframe of the multi-subframe interval. In the procedures of FIG. 5, this could for example result in the decoding performance for the subsequent subframe 21 being higher than the decoding performance for the first subframe 20.

As further illustrated in FIG. 5, the UE 200 may send acknowledgements for the data transmissions 505, 507, 509 to the network system 100. Such acknowledgements may include a positive acknowledgement indicating that data was successfully received by the UE 200 or a negative acknowledgement indicating that data was not successfully received by the UE 200. In this connection, data may be regarded as successfully received if the UE 200 was able to verify correct decoding of the data. The acknowledgements may in particular be ACK messages (positive acknowledgements) or NACK messages (negative acknowledgements) of a Hybrid Automatic Repeat Request (HARQ) protocol implemented between the network system 100 and the UE 200. FIG. 5, illustrates an exemplary acknowledgement 510, which may for example indicate unsuccessful reception of data transmission 504. In this case, the network system 100 initiates a retransmission of data transmission 504. For this purpose, the network system 100 sends a further assignment 511 to the UE 200 and sends the retransmission 512 in one or more resource elements indicated in the assignment. The further assignment may be a multi-TTI scheduling assignment, or may be a usual assignment covering only a single subframe.

In some scenarios, the UE 200 may send acknowledgements for reception of data separately for each subframe of the multi-subframe interval. For example, in the procedures of FIG. 5, the UE 200 could send separate acknowledgements for the subframes 20, 21, and 22. The separate sending of acknowledgements may for example have the effect that an NACK message for the first subframe 20 is transmitted earlier than a NACK message or ACK message for the subsequent subframes 21, 22. Accordingly, the network system 100 may be informed early of an unsuccessful attempt to decode received data at the UE 200. The network system 100 may utilize this information for initiating the retransmission 512 of the data early. The early indication of unsuccessful reception is specifically beneficial if the precoded RS are evaluated as they are received over the multi-subframe interval and the decoding performance in the first subframe 20 is lower than in the later subframes 21, 22, because the first subframe 20 may then have a higher likelihood of unsuccessful reception than the later subframes 21, 22. Such situation may be addressed by early indication of unsuccessful reception. Due to the higher decoding performance in the later subframes 21, 22, a retransmission might be required only for the first subframe 20, so that the scheduled data transmissions 505, 507, 509 may be completed in an efficient manner by performing the original data transmissions 505, 507, 509 as scheduled in the multi-subframe interval and performing the early retransmission for only the first subframe 20.

In some scenarios, the effect of increasing decoding performance during the multi-subframe interval may also be utilized by changing the modulation and coding scheme (MCS) between subframes of the multi-subframe interval. For example, the MCS may be changed between the first subframe 20 and the subsequent subframe 21 from a more robust MCS in the first subframe 20 to a more performance oriented MCS in the subsequent subframe 21. In this way, the likelihood of unsuccessful reception in the first subframe 20 may be reduced while maintaining an adequate performance in the subsequent subframe 21. This is particularly useful if the acknowledgements for the subframes of the multi-subframe interval are jointly transmitted, bundled or jointly encoded. The change of the MCS may also be applied for UL transmissions from the UE to the mobile communication network.

If the MCS is changed, this may be indicated from the network system 100 to the UE 200. In particular, the MCS of the first subframe 20 and subsequent subframes 21, 22 may be indicated independently as part of the multi-TTI assignment 503. This may for example be implemented by indicating a "delta MCS" relative a common reference MCS. Further, it is also possible to use an MCS back off for the first subframe 20 relative to the subsequent subframes 21, 22. Such MCS back off can be preconfigured in the UE 200, e.g., according to a standard, or may be semi-statically indicated to the UE, e.g., by RRC signalling. Still further, the MCS back off could be dynamically indicated in the DCI transmitted to the UE 200. The MCS back off could also be configured to decrease from subframe to subframe of the multi-subframe interval, thereby obtaining a successively increasing MCS performance.

The UE 200 may utilize the assumption of static precoding over the subframes 20, 21, 22 of the multi-subframe interval in various ways to improve estimation of the radio channel. For example, the UE 200 may perform combined evaluation of the received precoded RS by applying a filter to the received RS, e.g., to select a subset of the resource elements for evaluation. For example, such filter function could define a delay of one subframe until the UE 200 starts demodulating the received subframes 20, 21, 22, and the evaluation results of the last two received subframes could be applied for estimation of the radio channel to perform demodulation and decoding. In this way, the estimation performance can be kept substantially constant over the different subframes 20, 21, 22 of the multi-subframe interval.

Figure 6:
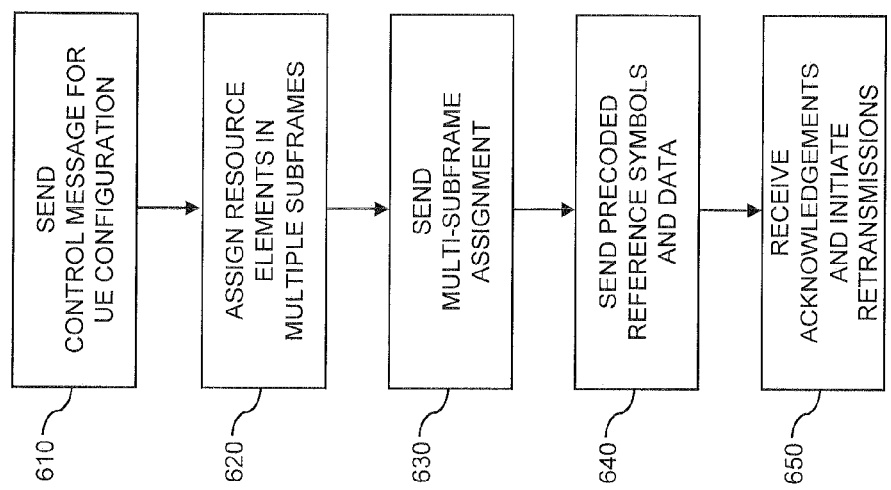
FIG. 6 shows a flowchart for illustrating a method according to an embodiment of the invention.

FIG. 6 shows a flowchart for illustrating a method of data transmission which may be used for implementing the above concepts in a network system, e.g., the network system 100.

At step 610, the network system may send a control message to a UE, e.g., to the UE 200. The control message may have the purpose of configuring the UE to use an operation mode in which the UE assumes precoding to be static for precoded RS which are transmitted in resource elements indicated in the same multi-subframe assignment. Such multi-subframe assignment may in particular be a multi-TTI scheduling assignment as explained above, e.g., the multi-TTI scheduling assignment 503. The control message may correspond to a RRC message, e.g., as explained in connection with the above-mentioned control message 501.

At step 620, the network system assigns resource elements in multiple subframes to the UE. These resource elements are thus located in a first subframe, e.g., the above-mentioned first subframe 20, and in at least one subsequent subframe, e.g., the above-mentioned subsequent subframes 21, 22.

At step 630, the network system sends a multi-subframe assignment to the UE, e.g., the above-mentioned multi-TTI scheduling assignment 503. The multi-subframe assignment is included in DL control information transmitted in the first subframe. The multi-subframe assignment indicates the resource elements assigned at step 620 to the UE. The resource elements may be indicated in terms of resource blocks including multiple resource elements, e.g., as explained above for the exemplary LTE implementation.

At step 640, the network system transmits precoded RS to the UE. This is accomplished in at least a part of the assigned resource elements in the first subframe and at least a part of the assigned resource elements in the at least one subsequent subframe. Since the precoded RS are transmitted in resource elements assigned to the UE, they may be regarded as UE specific.

In the method of FIG. 6, the control message of step 610 constitutes indication that the UE is allowed to assume that precoding of the received precoded RS is static over the first subframe and the at least one subsequent subframe. The subframes to which this assumption is applicable can be deduced from the multi-subframe assignment of step 630. In other implementations, the applicability of the assumption may be indicated in a different manner, e.g., by supplementing the multi-subframe assignment with a corresponding indication.

At step 650, the network system may receive acknowledgements from the UE and, depending on the acknowledgements, initiate retransmissions. By means of such acknowledgements, successful reception of data in the assigned resource elements in the first subframe and the at least one subsequent subframe is indicated. In some implementations, the acknowledgements are received separately for each of the first subframe and the at least one subsequent subframe. Alternatively, the acknowledgements may be received jointly for at least some of the the first subframe and the at least one subsequent subframe. If the acknowledgements include a negative acknowledgement indicating unsuccessful reception of the data, the network system may initiate retransmission of the data.

In some implementations, the network system may also change a modulation and/or coding scheme between transmission of the first subframe and transmission of the at least one subsequent subframe. Such change of modulation and/or coding scheme may be indicated to the UE, e.g., in the downlink control information transmitted in the first subframe.

Figure 7:
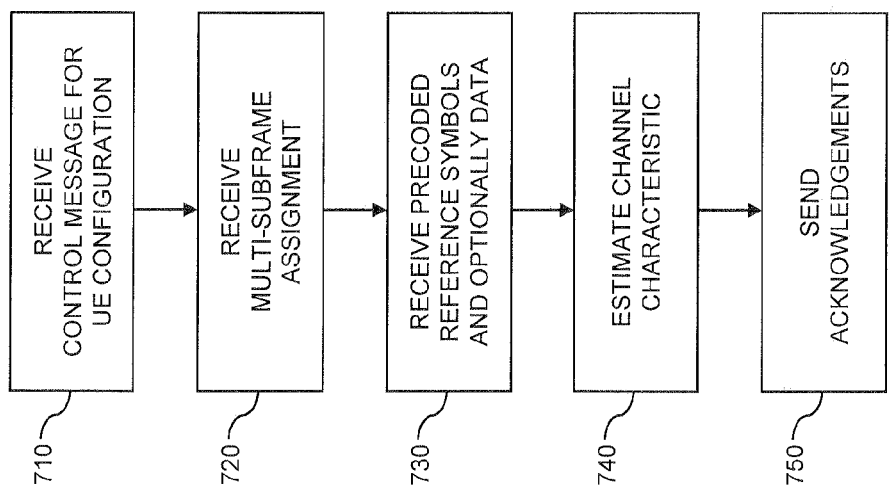
FIG. 7 shows a flowchart for illustrating a further method according to an embodiment of the invention.

FIG. 7 shows a flowchart for illustrating a method of data transmission which may be used for implementing the above concepts in a UE, e.g., the UE 200.

At step 710, the UE may receive a control message, e.g., from a network system such as the network system 100. The control message may have the purpose of configuring the UE to use an operation mode in which the UE assumes precoding to be static for precoded RS which are transmitted in resource elements indicated in the same multi-subframe assignment. Such multi-subframe assignment may in particular be a multi-TTI scheduling assignment as explained above, e.g., the multi-TTI scheduling assignment 503. The control message may correspond to a RRC message, e.g., as explained in connection with the above-mentioned control message 501.

At step 720, the UE receives a multi-subframe assignment, e.g., the above-mentioned multi-TTI scheduling assignment 503. The multi-subframe assignment is included in DL control information transmitted in the first subframe. The multi-subframe assignment indicates resource elements assigned to the UE. These resource elements are located in a first subframe, e.g., the above-mentioned first subframe 20, and in at least one subsequent subframe, e.g., the above-mentioned subsequent subframes 21, 22. The resource elements may be indicated in terms of resource blocks including multiple resource elements, e.g., as explained above for the exemplary LTE implementation.

At step 730, the UE receives precoded RS. This is accomplished in at least a part of the assigned resource elements in the first subframe and at least a part of the assigned resource elements in the at least one subsequent subframe. Since the precoded RS are transmitted in resource elements assigned to the UE, they may be regarded as UE specific. Optionally, the UE may also receive data in a part of the assigned resource elements.

At step 740, the UE may estimate a radio characteristic from the precoded RS received in the different subframes. On the basis of the estimated channel characteristic, the UE may perform performing demodulation and/or decoding of a data transmission in one or more of the assigned resource elements.

At step 750, the UE may send acknowledgements. By means of such acknowledgements, successful reception of data in the assigned resource elements in the first subframe and the at least one subsequent subframe is indicated. In some implementations, the acknowledgements are sent separately for each of the first subframe and the at least one subsequent subframe. Alternatively, the acknowledgements may be sent jointly for at least some of the the first subframe and the at least one subsequent subframe.

In the method of FIG. 7, the control message of step 710 constitutes indication that the UE is allowed to assume that precoding of the received precoded RS is static over the first subframe and the at least one subsequent subframe. The subframes to which this assumption is applicable can be deduced from the multi-subframe assignment of step 720. In other implementations, the applicability of the assumption may be indicated in a different manner, e.g., from a corresponding indication in the multi-subframe assignment.

In some implementations, the UE may also change a modulation and/or coding scheme between reception of the first subframe and reception of the at least one subsequent subframe. Such change of modulation and/or coding scheme may be indicated to the UE, e.g., in the downlink control information transmitted in the first subframe.

As can be seen, the methods of FIGS. 6 and 7 may be combined with each other in a system including the network system and the UE. In such implementation, the method of FIG. 6 could be used for sending the control message, multi-subframe assignment, precoded RS, data, and/or retransmissions to the UE, and the method of FIG. 7 could be used for receiving such elements from the network system and/or for sending the acknowledgements to the network system.

Figure 8:
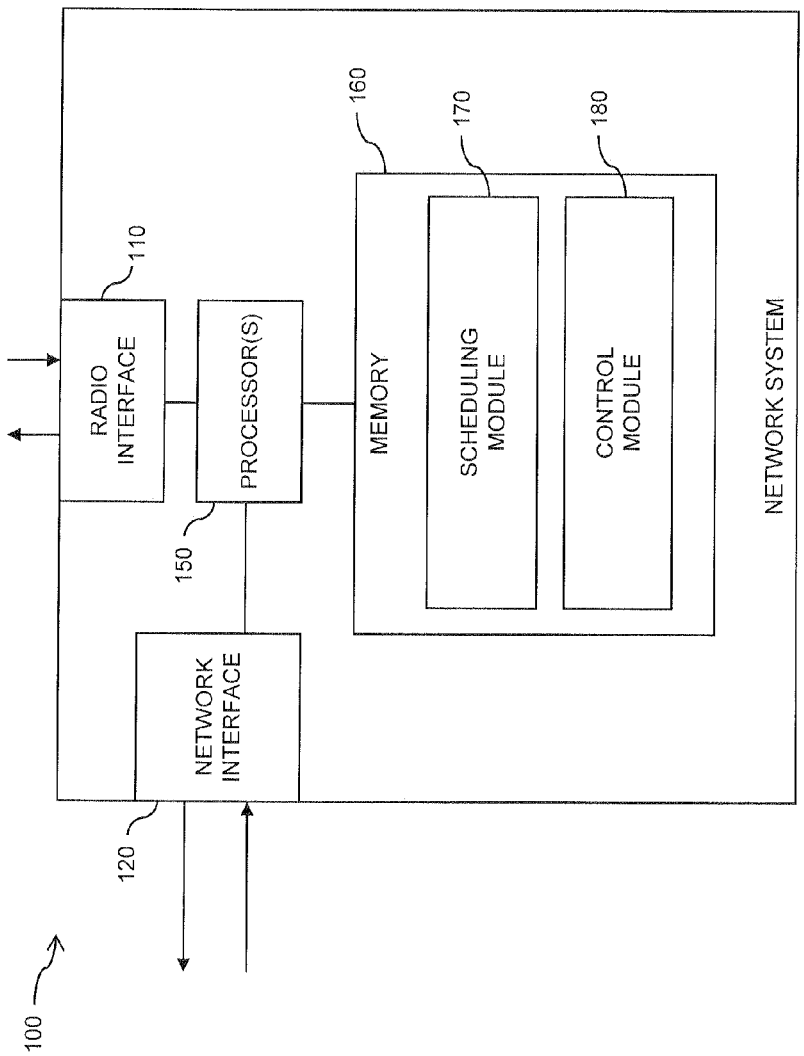
FIG. 8 schematically illustrates a network system according to an embodiment of the invention.

FIG. 8 illustrates exemplary structures which may be used for implementing the network system 100. In FIG. 8, the network system 100 is illustrated as being implemented as a single node. However, it is to be understood the network system 100 could also be implemented by multiple nodes, e.g., a base station and a separate controller of the base station.

As illustrated, the network system 100 may include a radio interface 110 for connecting to a UE. Further, the network system 100 may include a network interface 120.

Further, the network system 100 includes one or more processors 150 coupled to the interfaces 110, 120, and a memory 160 coupled to the processor(s) 150. The memory 960 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor(s) 150 so as to implement the above-described functionalities of the network system 100. In particular, the memory 160 may include a scheduling module 170 so as to implement the above-described functionalities of assigning resource elements and sending multi-subframe assignments, typically using the radio interface 110. Further, the memory 160 may also include a control module 180 for implementing various control processes, e.g., to control the sending of precoded RS and typically also data in the assigned resource elements.

It is to be understood that the structure as illustrated in FIG. 8 is merely schematic and that the network system 100 may actually include further components which, for the sake of clarity, have not been illustrated, e.g., further interfaces. Also, it is to be understood that the memory 160 may include further types of program code modules, which have not been illustrated, e.g., program code modules for implementing known functionalities of an eNB or base station controller. According to some embodiments, also a computer program product may be provided for implementing functionalities of the network system 100, e.g., in the form of a medium storing the program code and/or other data to be stored in the memory 160.

Figure 9:
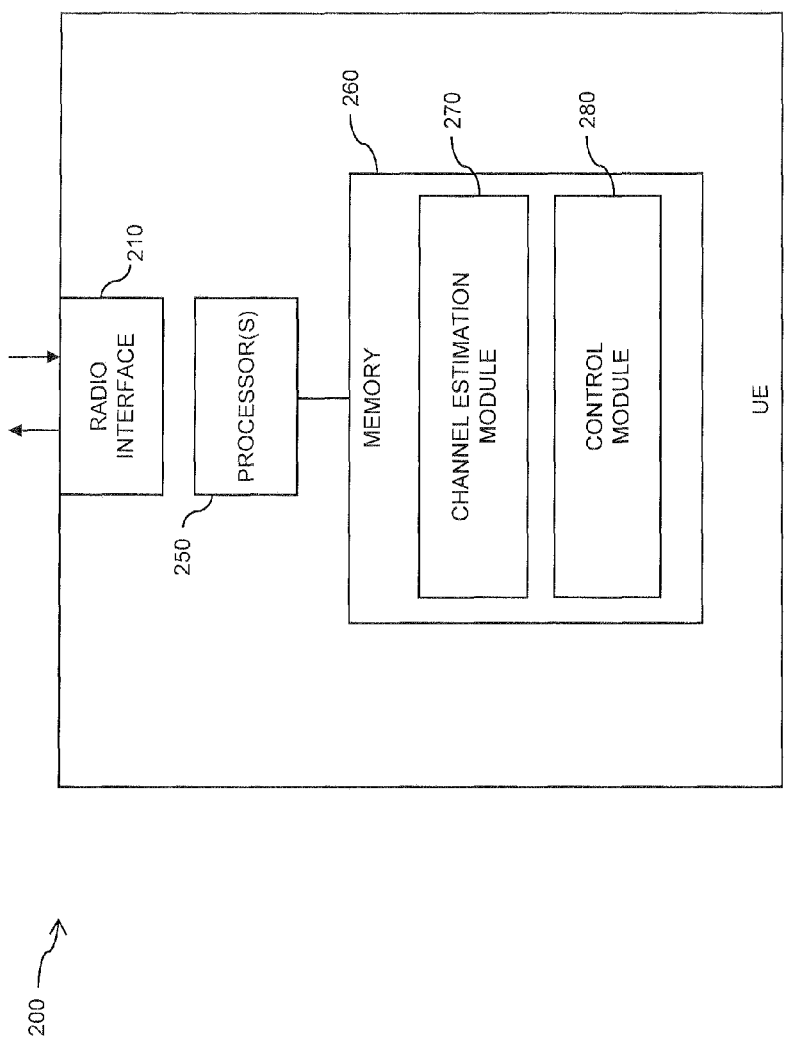
FIG. 9 schematically illustrates a UE according to an embodiment of the invention.

FIG. 9 illustrates exemplary structures which may be used for implementing the UE 200. As illustrated, the UE 200 may include a radio interface 210 for connecting to the mobile communication network, in particular to the network system 100.

Further, the UE 200 includes one or more processors 250 coupled to the interface 210, and a memory 260 coupled to the processor(s) 250. The memory 260 may include a ROM, e.g., a flash ROM, a RAM, e.g., a DRAM or SRAM, a mass storage, e.g., a hard disk or solid state disk, or the like. The memory 260 includes suitably configured program code to be executed by the processor(s) 250 so as to implement the above-described functionalities of the UE 200. In particular, the memory 260 may include a channel estimation module 270 so as to implement the above-described functionalities of performing channel estimation on the basis of precoded RS from multiple subframes. Further, the memory 260 may also include a control module 280 for implementing various control processes, e.g., to control the reception of precoded RS and typically also data in the assigned resource elements, to control the demodulation and decoding process, or to control the sending of acknowledgements.

It is to be understood that the structure as illustrated in FIG. 9 is merely schematic and that the UE 200 may actually include further components which, for the sake of clarity, have not been illustrated, e.g., further interfaces. Also, it is to be understood that the memory 260 may include further types of program code modules, which have not been illustrated, e.g., program code modules for implementing known functionalities of a UE. According to some embodiments, also a computer program product may be provided for implementing functionalities of the UE 200, e.g., in the form of a medium storing the program code and/or other data to be stored in the memory 260.

As can be seen, the concepts as described above may be used for efficiently utilizing precoded RS for channel estimation. This may in turn be used for improving data transmission performance.

It is to be understood that the examples and embodiments as explained above are merely illustrative and susceptible to various modifications. For example, the concepts as described herein could be used in connection with various types of radio access technology. Further, the evaluation of the precoded RS may be performed on the basis of various channel estimation algorithms. Also, the concepts may also be extended to improving UL transmission. For example, the channel estimation may in some cases also be used for controlling UL transmissions. Still further, the switching of MCS schemes could be applied in a similar manner for multi-TTI UL scheduling grants. Moreover, it is to be understood that the above concepts may be implemented by using correspondingly designed software to be executed by a processor of an existing device, or by using dedicated device hardware. Still further, it is to be understood that the above-mentioned nodes may each be implemented by a single device or by multiple devices, e.g., by a device cloud or the like.

The invention claimed is:

1. A method of data transmission in a wireless communication network using a radio channel divided into subframes in the time domain, the method comprising:
    a network system assigning resource elements in a first subframe and at least one subsequent subframe to a user equipment;
    the network system sending a multi-subframe assignment indicating the assigned resource elements to the user equipment by downlink control information transmitted in the first subframe;
    the network system transmitting precoded reference symbols to the user equipment in at least a part of the assigned resource elements in the first subframe and at least a part of the assigned resource elements in the at least one subsequent subframe; and
    the network system sending, to the user equipment, an explicit indication that the user equipment is allowed to assume that precoding of the reference symbols is static over the first subframe and the at least one subsequent subframe.

2. The method of claim 1, wherein the network system sends, to the user equipment, a control message for configuring the user equipment to use an operation mode in which the user equipment assumes precoding to be static for precoded reference symbols which are transmitted in resource elements indicated in the same multi-subframe assignment.

3. The method of claim 1, further comprising:
    the network system receiving, from the user equipment, acknowledgements for reception of data in the assigned resource elements in the first subframe and the at least one subsequent subframe; and wherein the acknowledgements are received separately for each of the first subframe and the at least one subsequent subframe.

4. The method of claim 3, further comprising, in response to the received acknowledgements including a negative acknowledgement indicating unsuccessful reception of the data, the network system initiating retransmission of the data.

5. The method of claim 1, further comprising the network system changing a modulation and/or coding scheme between transmission of the first subframe and transmission of the at least one subsequent subframe.

6. The method of claim 5, further comprising the network system sending an indication of the change of modulation and/or coding scheme to the user equipment.

7. The method of claim 6, wherein the network system sends the indication of the change of modulation and/or coding scheme in the downlink control information transmitted in the first subframe.

8. A method of data transmission in a wireless communication network using a radio channel divided into subframes in the time domain, the method comprising:

a user equipment receiving downlink control information comprising a multi-subframe assignment indicating resource elements in a first subframe and in at least one subsequent subframe, the resource elements being assigned to the user equipment;

the user equipment receiving precoded reference symbols in at least a part of the assigned resource elements in the first subframe and at least a part of the assigned resource elements in the at least one subsequent subframe; and the user equipment receiving an explicit indication that the user equipment is allowed to assume that precoding of the reference symbols is static over the first subframe and at least one subsequent subframe.

9. The method of claim 8, further comprising the user equipment estimating a radio channel characteristic from the received reference symbols.

10. The method of claim 9, further comprising the user equipment performing demodulation and/or decoding of a data transmission in one or more of the assigned resource elements based on the estimated channel characteristic.

11. The method of claim 8, further comprising the user equipment receiving an indication that the user equipment is allowed to assume that precoding of the reference symbols is static over the first subframe and the at least one subsequent subframe.

12. The method of claim 11, further comprising:
the user equipment receiving a control message;
in response to the control message, the user equipment using an operation mode in which the user equipment assumes precoding to be static for precoded reference symbols which are transmitted in resource elements indicated in the same multi-subframe assignment.

13. The method of claim 8, further comprising the user equipment sending acknowledgements for reception of data in the assigned resource elements in the first subframe and the at least one subsequent subframe; wherein the acknowledgements are sent separately for each of the first subframe and the at least one subsequent subframe.

14. The method of claim 8, further comprising the user equipment receiving an indication of a change of modulation and/or coding scheme between the first subframe and the at least one subsequent subframe.

15. The method of claim 14, wherein the user equipment receives the indication of the change of modulation and/or coding scheme in the downlink control information transmitted in the first subframe.

16. A network system for data transmission in a wireless communication network using a radio channel divided into subframes in the time domain, the network system comprising:

an interface for connecting to a user equipment; and
at least one processing circuit configured to:
assign resource elements in a first subframe and at least one subsequent subframe to the user equipment;
send a multi-subframe assignment indicating the assigned resource elements to the user equipment by downlink control information transmitted in the first subframe;
transmit precoded reference symbols to the user equipment in at least a part of the assigned resource elements in the first subframe and at least a part of the assigned resource elements in the at least one subsequent subframe; and
send, to the user equipment, an explicit indication that the user equipment is allowed to assume that precoding of the reference symbols is static over the first subframe and at least one subsequent subframe.

17. A user equipment for data transmission in a wireless communication network using a radio channel divided into subframes in the time domain, the user equipment comprising:

a radio interface for connecting to the wireless communication network; and
at least one processing circuit configured to:
receive downlink control information comprising a multi-subframe assignment indicating resource elements in a first subframe and in at least one subsequent subframe, the resource elements being assigned to the user equipment;
receive precoded reference symbols in at least a part of the assigned resource elements in the first subframe and at least a part of the assigned resource elements in the at least one subsequent subframe; and
receive an explicit indication that the user equipment is allowed to assume that precoding of the reference symbols is static over the first subframe and at least one subsequent subframe.

18. A computer program product stored in a non-transitory computer readable medium for controlling data transmission in a wireless communication network using a radio channel divided into subframes in the time domain, the computer program product comprising software instructions which, when run on one or more processing circuits of a network system, causes the network system to:

assign resource elements in a first subframe and at least one subsequent subframe to a user equipment;
send a multi-subframe assignment indicating the assigned resource elements to the user equipment by downlink control information transmitted in the first subframe;
transmit precoded reference symbols to the user equipment in at least a part of the assigned resource elements in the first subframe and at least a part of the assigned resource elements in the at least one subsequent subframe; and
send, to the user equipment, an explicit indication that the user equipment is allowed to assume that precoding of the reference symbols is static over the first subframe and the at least one subsequent subframe.

19. A computer program product stored in a non-transitory computer readable medium for controlling data transmission in a wireless communication network using a radio channel divided into subframes in the time domain, the computer program product comprising software instructions which, when run on one or more processing circuits of a user equipment, causes the user equipment to:

receive downlink control information comprising a multi-subframe assignment indicating resource elements in a first subframe and in at least one subsequent subframe, the resource elements being assigned to the user equipment;

receive precoded reference symbols in at least a part of the assigned resource elements in the first subframe and at least a part of the assigned resource elements in the at least one subsequent subframe; and receive an explicit indication that the user equipment is allowed to assume that precoding of the reference symbols is static over the first subframe and at least one subsequent subframe.

20. The method of claim 1, wherein the explicit indication indicates that the user equipment is allowed to selectively assume that precoding of the reference symbols is static over the first subframe and the at least one subsequent subframe.

21. The method of claim 1, wherein said selectively assuming includes to apply the assumption only over a portion of the subframes.

* * * * *